Figure 1:
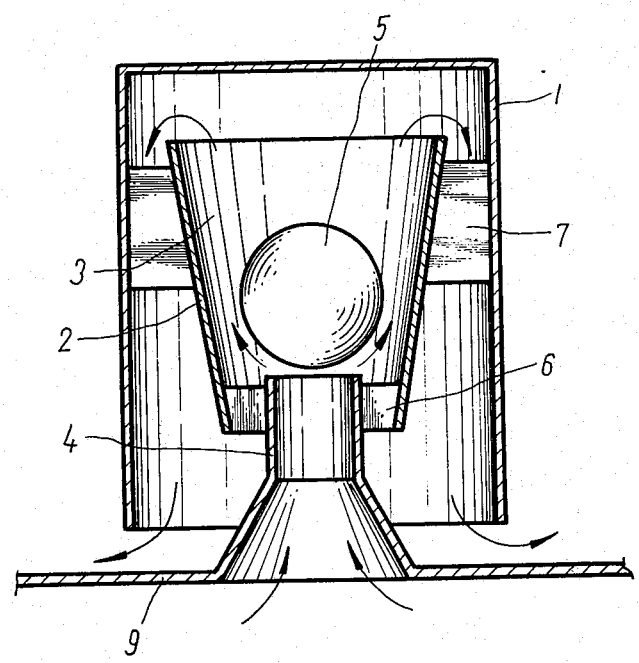

United States Patent [19]
Beranek et al.

[11] 3,921,663
[45] Nov. 25, 1975

[54] CAP FOR INLET OF FLUID INTO A FLUIDIZED BED

[75] Inventors: Jaroslav Beranek, Prague, Czechoslovakia; Vladimír Bazant, deceased, late of Prague, Czechoslovakia; by Vera Bažantova, heir, Prague, Czechoslovakia; by Petr Bazant, heir, Prague, Czechoslovakia; by Ondrej Bazant, heir, Prague, Czechoslovakia; by Jan Bazant, heir, Prague, Czechoslovakia; by Vladimir Bazant, heir, Prague, Czechoslovakia; Robert Rössler, Jirkov, Czechoslovakia; Jaroslav Dobrozemský, Roznov pod Radhostem, Czechoslovakia; Vratislav Fibinger, Ostrava, Czechoslovakia; Josef Dolanský, Jirkov, Czechoslovakia; Jaroslav Vávra, Ostrava, Czechoslovakia

[73] Assignee: Ceskoslovenska akademie ved, Prague, Czechoslovakia

[22] Filed: Sept. 10, 1973

[21] Appl. No.: 395,853

[30] Foreign Application Priority Data
Sept. 11, 1972  Czechoslovakia .................. 6212-72

[52] U.S. Cl. ....... 137/533.11; 34/57 A; 261/114 VT
[51] Int. Cl.$^2$ ......................................... F16K 15/04
[58] Field of Search ......... 23/288 S; 34/57 R, 57 A; 137/512.1, 533.11, 533.13; 261/114 VT

[56]       References Cited
           UNITED STATES PATENTS

| 185,210 | 12/1876 | Carricaburu ............... 137/533.11 X |
| 665,962 | 1/1901 | Grace ........................ 137/533.11 X |
| 1,610,602 | 12/1926 | Crickmer ..................... 137/533.11 |
| 1,861,982 | 6/1932 | Schiller ...................... 137/533.13 X |
| 2,278,715 | 4/1942 | Stoyke et al. ............... 137/533.13 X |
| 2,899,974 | 8/1959 | Gratzmuller .................. 137/533.11 |
| 3,163,684 | 12/1964 | Gilbert ....................... 137/533.11 X |

FOREIGN PATENTS OR APPLICATIONS 485,050  10/1929  Germany ..................... 261/114 VT

*Primary Examiner*—Robert G. Nilson

[57] ABSTRACT

A cap for the inlet of fluid into a fluidized bed at a constant pressure drop. Situated in the cap is a tubular element free of the cap and having a curved shape or the shape of a polyhedron. Into the internal space of the cap fluid is fed from the bottom side through an inlet pipe spaced from the walls of the element. In the internal space of the element there is freely situated a float having the shape of a body of revolution, at least the bottom part of the float being spherical, the cap, the element, the inlet pipe and the float being coaxial.

7 Claims, 2 Drawing Figures

CAP FOR INLET OF FLUID INTO A FLUIDIZED BED

The invention relates to a cap for the inlet of fluid into a fluidized bed with a constant pressure drop. More accurately, the invention concerns the caps for feeding fluids into fluidized beds for which the change of hydraulic resistance in dependence upon the flow of the fluid is insignificant.

With the present technique, fluid is introduced into a fluidized bed of solid particles through porous or flat bottoms with drilled holes of fluidized vessels, that is, so-called distributors, with their construction differing according to the behaviour of solid particles after the gas inlet is stopped i.e. depending upon whether the particles can pass through the holes in the distributor or remain on it. In number of processes, the solid particles are required to remain on the distributor. In this case, distributors with a system of caps are used which are described e.g. by N. J. Gelperin and co-authors in the publication "Fluidization Principles" (in Russian) (Moscow (1967) chapter XI).

The types of caps which are presently known are suitable for units wherein a steady and invariable fluid flow passes through the fluidized bed. This occurs with the fluidized roasting of pyrites, fluidized roasting of zinc concentrates and in the oxidation of hydrocarbons in fluidized beds of catalysts where the reaction conditions and capacities of the unit do not change during the operation.

But this method of operation is not suitable for some processes e.g. for the fuel combustion in power plants where the thermal capacity of the furnace must be varied so that its maximum capacity is three-times its minimum capacity. It is known that the ratio of thermal capacities corresponds approximately to the ratio of the air consumed in burning the fuel, which also means that the maximum gas flow rate through the caps of the distributor has to be three-fold the minimum value. This means that the hydraulic resistance of the cap changes approximately in the ratio 1:9, which is a very disadvantageous change for industrial purposes.

If the cross-sections of the cap are chosen so as to secure a uniform distribution of the air over the whole cross-section of the fluidized bed at the lowest value of the required capacity, then at the highest required capacity of the furnace due to the increased hydraulic resistance the cost of the air introduced into the fluidized bed is considerably increased. The contrary is true, if the cross-section of the caps chosen so that their hydraulic resistance corresponds to the higher air demand at low air flow rates the air is not distributed uniformly over the cross-sectional area of the fluidized bed, and an irregular burning of the full takes place.

Thus it becomes suitable and advantageous to design a device which will eliminate the disadvantages of the so far known constructions, especially a device in which the resistance of the caps will be self-controlled in dependence on the flow rate of the introduced fluid.

These requirements are met by this invention of a cap for the introduction of fluid into the fluidized bed at a constant pressure drop. The basis of this invention is a design according to which there is arranged in the cap an element with a curved surface or in the shape of an polyhedron without cover where into its internal space the inlet pipe for fluid is introduced from the bottom and is situated spaced from the walls of the element in the cap, while in the internal space of the element in the cap there is freely situated a float having the shape of a body of revolution where at least the bottom part of the float is spherical e.g. it has the shape of a spherical element and where the cap, the element and the inlet pipe are situated coaxially. In the cap between the upper end of the inlet pipe and the internal wall of the element there can be arranged at least one distance spacer, and between the external wall of the element and the internal wall of the cap there can be arranged at least one distance spacer; the cap element can have the shape of a converted truncated cone or converted truncated pyramid or the shape of a cylinder, and in the wall of the element between the upper and lower limiting positions of the float there can be situated at least one hole/or a slot.

In the attached drawings there are illustrated two examples of caps according to this invention.

In FIG. 1 there is shown a cap 1 having an outer housing in the form of an inverted cup having a vertical side wall and an upper end wall in which the internal element 2 has a shape of a converted truncated conical tube cone.

Figure 2:
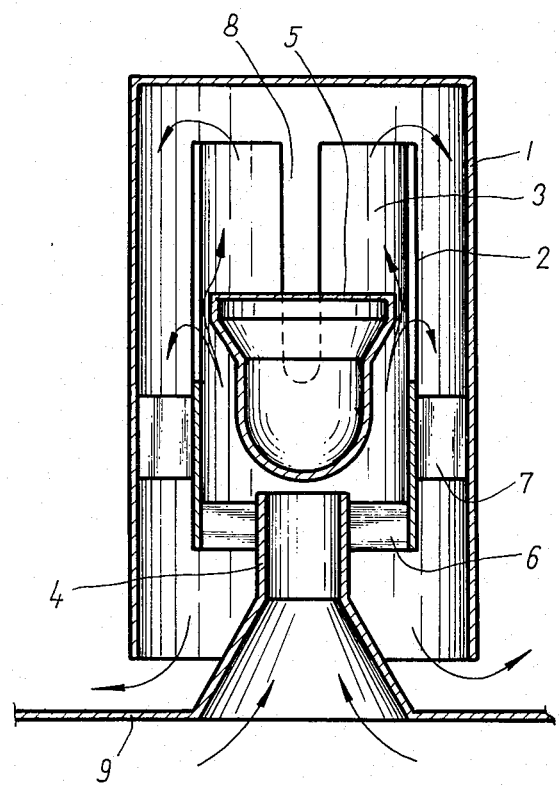

In FIG. 2 there is shown a cap 1 in which the internal element 2 has the shape of a cylindrical tube in the jacket of which there are provided slots. In FIG. 1 in the cap 1 there is situated the element 2 having the shape of a converted truncated cone; into its internal space 3 in the direction contrary to the earth gravitation there is situated the inlet pipe 4 of fluid. Between the pipe 4 and the wall of the element 2 of the cap there is situated an internal distance spacer 6. The external distance spacer 7 is situated between the external wall of the element 2 of the cap and the internal wall of the cap 1. In the internal space 3 of the element 2 of the cap 1 there is freely situated a spherical float.

In FIG. 2 there is shown a cap 1 which differs from that in FIG. 1 by the cylindrical shape of the element situated inside it, while in its internal space 3 there is freely situated a float 5. The upper one third of the float has the shape of a converted truncated cone, its central part is cylindrical and its bottom part has the shape of a spherical segment. Along the whole circumference of the element walls 2 between the upper and lower limiting positions of the float 5 there are slots 8.

When using the device according to the invention for burning solid fuels, air is introduced below the distributor 9 which enters through the inlet pipe 4 into the element 2 of the cap 1 which is connected with the element 2 by the distance spacer 7. Simultaneously the element 2 is kept at the required distance from th inlet pipe 3 by the distance spacer 6.

The air leaving the inlet pipe 4 acts upon the float 5 which is thus moved in the upward direction. The inlet pipe 4 is in this case arranged so that the velocity of the flowing gas in the free space between the float 5 and the element 2 remains the same even at different flow rates of the flowing fluid. This is accomplished either by the shape of the element, in this case a converted truncated cone, or by adjustment of the jacket of the element 2 in which there are, within the range between the upper and lower limiting positions of the float 5, slots 8.

The static pressure in the space between the inlet pipe 4 which is given by the mass of the float 5 remains constant, and thus the dependence of the increased hydraulic resistance of the cap 1 on the flow rate is constant in both cases i.e. in the case of cap 1 with the float 5 as well as in the case of the cap 1 without the float 5.

The invention can be used in all equipments with fluidized beds in which the flow rate varies e.g. for fluidized furnaces for the burning of solid, liquid or gaseous fuels which are accompanied with de-sulphurization of the product of combustion, and for the roasting of sulphur concentrates, for drying, classification, catalytic reactions etc. in chemical, power, metalurgy and mechanical engineering etc.

The following examples demonstrate the application and the basical principles of this invention without any limiting whatsoever of the range of its application.

EXAMPLE 1

For the inlet of air into the experimental fluidized furnace there is used a distributor with 36 caps with the construction in FIG. 1. The ratio of free areas between the spherical float 5 in limiting positions and with the element 2 in this case is 1:3. For the flow of the gas at the minimum fluidization velocity for brown coal with particles in the range from 0 to 3 mm, the hydraulic resistance of the distributor is 1 520 N/m$^2$. Upon increasing the air flow rate three-fold, the hydraulic resistance of the distributor is increased to 1 740 N/m$^2$. Upon a further increase of the flow rate, the hydraulic resistance of the distributor decreases until it reaches a value 1 480 N/m$^2$ at the five-fold increase of its flow rate.

EXAMPLE 2

Experiments were made with a fluidized furnace as given in Example 1 in which the cap according to FIG. 2 is used. Under the same conditions as in example 1 at the lowest air flow rate the hydraulic resistance of the distributor is 1 490 N/m$^2$, and at a three-fold increase of the air flow rate the resistance is found to be 1 510 N/m$^2$. With a five-fold increase of the air flow rate the resistance becomes 1 920 N/m$^2$.

EXAMPLE 3

In a pilot-plant reactor for the oxidation of butenes to maleicanhydride in a fluidized bed of catalysts with the size of particles in the range from 0.25 to 0.5 mm, caps according to FIG. 2 are used, with the float 5 having a spherical shape. The width of slots 8 having the shape of a double threaded helics equal the five-fold of the width of the passage between the wall of the float 5 and the internal wall of the element 2. If the air passes at the minimum fluidization velocity, the hydraulic resistance of the distributor accounts for 4 210 N/m$^2$; at a three-fold increase of the air flow rate from the initial flow rate, the hydraulic resistance of the distributor increases to 4 540 N/m$^2$.

What is claimed is:

1. A cap for the inlet of fluid into a fluidized bed with a constant pressure drop, said cap comprising an outer housing in the form of an inverted cup having a vertical side wall and an upper end wall, a tubular element vertically disposed in the housing, the side wall and upper end of the element being positioned spaced from the side walls and the upper end wall of the housing, respectively, an inlet pipe communicating with the lower end of the tubular element for feeding fluid into the internal space of the element and thence into the internal space of the housing, a float disposed within the internal space of the element for free movement with respect thereto, the element, the inlet pipe and the float being coaxial, the float having the shape of a body of revolution, at least the bottom part of the float being spherical, the fluid introduced through the inlet pipe passing vertically upwardly in the element past the float and being diverted by the upper end wall of the housing to flow downwardly within the housing and to escape laterally from beneath the lower edge of the side wall of the housing.

2. A cap according to claim 1, wherein the bottom part of the float has the shape of a spherical segment.

3. A cap according to claim 1, comprising at least one distance spacer situated between the upper end of the inlet pipe and the internal wall of the element.

4. A cap according to claim 1, comprising at least one distance spacer situated between the external wall of the element and the internal wall of the cap.

5. A cap according to claim 1, wherein the element increases in diameter in a direction away from the inlet pipe.

6. A cap according to claim 1, wherein the element has a cylindrical shape.

7. A cap according to claim 1, wherein there is at least one slot in the wall of the tubular element between the highest and lowest operating positions of the float.

* * * * *